J. M. HORRIDGE.
CONTROLLER VALVE.
APPLICATION FILED FEB. 20, 1908.
930,860.
Patented Aug. 10, 1909.
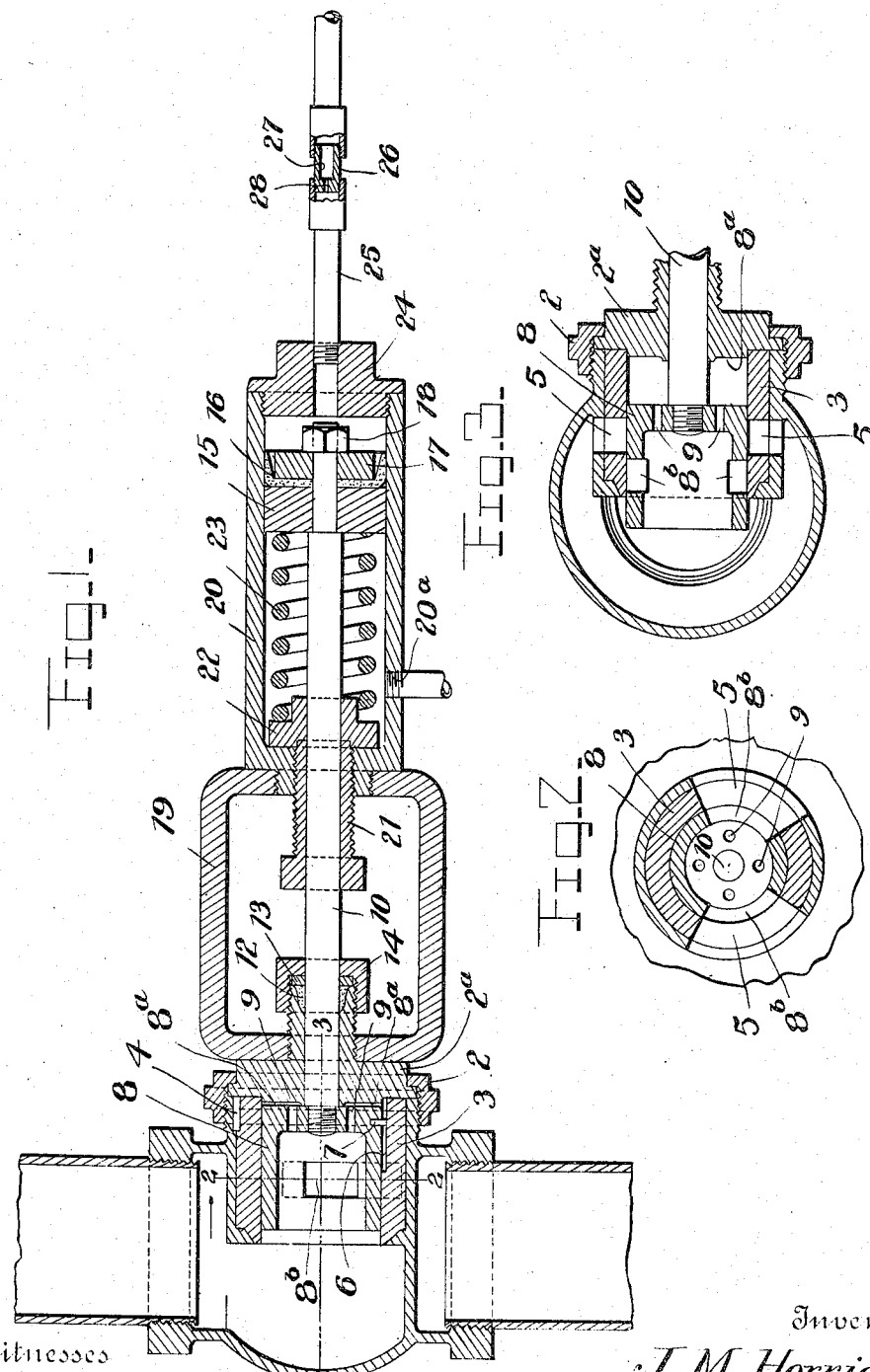
Inventor
J. M. Horridge

UNITED STATES PATENT OFFICE.

JOHN M. HORRIDGE, OF LOS ANGELES, CALIFORNIA.

CONTROLLER-VALVE.

No. 930,860.           Specification of Letters Patent.       Patented Aug. 10, 1909.

Application filed February 20, 1908. Serial No. 416,949.

*To all whom it may concern:*

Be it known that I, JOHN M. HORRIDGE, a citizen of the United States, residing at Los Angeles, in the county of Los Angeles and State of California, have invented certain new and useful Improvements in Controller-Valves; and I do declare the following to be a full, clear, and exact description of the invention, such as will enable others skilled in the art to which it appertains to make and use the same.

This invention relates to valves for regulating or controlling the flow of steam under pressure.

The object of the invention is to provide a pump with a valve of this character which is simple in construction and accurate in operation.

In the accompanying drawings, Figure 1 is a longitudinal sectional view showing a valve constructed in accordance with this invention, Fig. 2 is a transverse section taken on the line 2—2 of Fig. 1, Fig. 3 is a sectional view taken on the line 3—3 of Fig. 1, showing the valve closed.

In the embodiment illustrated a globe or valve casing 1 is shown through which the steam passes, and which is provided with an outside nut 2 on its bonnet $2^a$. A bushing 3 fits inside said valve casing 1, and is keyed at 4 to prevent turning thereof. The bushing 3 is provided with steam ports 5 and a slot 6 to receive a dowel pin 7. A reciprocating valve 8 is arranged within said bushing 3 and is provided with a plurality of holes 9, preferably four to balance it and with steam ports $8^b$ which register with the ports 5 of the bushing when the valve is open. A space $8^a$ is provided between said valve 8 and the bonnet $2^a$ to permit the steam to pass in and form a balance for the valve. A stem 10 is screwed into the center of said valve 8 and is preferably provided with a dowel pin, to prevent its turning in the valve and thereby hold the parts in position. The bonnet $2^a$ has a stuffing box 12, a gland 13 and a nut 14 to provide for the packing thereof, to keep it tight around the stem 10. This stem 10 carries the valve 8 at one end and the piston 15, a leather gasket 16, retaining washer 17 and nut 18 at its other end.

A bracket 19 secures the bonnet $2^a$ to a cylinder 20. A hollow adjusting screw 21 surrounds and is slidable on the stem 10, and screws into the bracket 19 and cylinder 20 and bears against a retainer 22, which holds the spring 23 in place in the cylinder 20. The spring 23 is coiled on the stem 10 and bears at its other end against the piston 15 and regulates the pressure thereon and tends to hold the valve 8 in open position.

A cap 24 is screwed in the outer end of the cylinder 20, and is provided with an internally screw threaded tap hole to receive the pipe 25 which admits the water into the cylinder. The cylinder is provided with a one-eighth inch tap hole $20^a$ in its bottom to provide a drain for the cylinder in case the gasket 16 should leak.

A brass nipple 26 is arranged in the pipe 25 and has a one-fourth inch bore 27 extending about two-thirds of its length which is reduced at the inner end of the nipple to a one-sixteenth inch bore 28. This nipple is used on the governor so that when the pressure on the pump (not shown) is reduced the water will pass through said nipple slowly and prevent too rapid opening of the governor valve and consequent pounding of the pump.

In the use of this valve when the pressure in the pump becomes excessive the water is forced through the pipe 25 into the cylinder 20 and forces the piston 15 on the stem 10 back against the tension of the spring 23 carrying with it the valve 8 thereby gradually reducing the size of the openings $8^b$ of said valve and shutting off the passage of the steam therethrough. As the pressure in the pump is reduced the water will flow back slowly through the pipe 25 and nipple 26 permitting the piston 15 to be moved forward under the action of the spring 23 and the valve 8 again slowly opened.

Having thus particularly described and ascertained the nature of my invention and in what manner the same is to be performed, what I claim as my invention is:

In a pressure governor, the combination of a steam pipe, a casing therein, a sleeve in said casing provided with opposite peripheral ports, a piston-valve in said sleeve provided with opposite ports which control the ports in the sleeve, a guide-way in said sleeve coöperating with a pin on said valve, a reciprocating stem secured to said valve and to a spring-held piston, means for supplying fluid pressure to said piston in opposition to said spring, means for regulating the tension of the spring, and means for retarding the flow of fluid pressure to the piston, substantially as specified.

In testimony whereof I have hereunto set my hand in presence of two subscribing witnesses.

JOHN M. HORRIDGE.

Witnesses:
R. S. A. MORSE,
MARIE PRESTON.